United States Patent [19]

Rossmann

[11] Patent Number: 5,474,421

[45] Date of Patent: Dec. 12, 1995

[54] TURBOMACHINE ROTOR

[75] Inventor: Axel Rossmann, Karlsfeld, Germany

[73] Assignee: MTU Motoren- und Turbinen- Union Muenchen GmbH, Munich, Germany

[21] Appl. No.: 276,942

[22] Filed: Jul. 19, 1994

[30] Foreign Application Priority Data

Jul. 24, 1993 [DE] Germany ............ 43 24 960.4

[51] Int. Cl.$^6$ ................ F01D 5/16; F01D 5/26
[52] U.S. Cl. ................ 416/203; 416/219 R
[58] Field of Search ................ 416/175, 203, 416/190, 191, 219 R, 500

[56] References Cited

U.S. PATENT DOCUMENTS

| | | | |
|---|---|---|---|
| 2,772,854 | 12/1956 | Anxionnaz. | |
| 2,916,258 | 12/1959 | Klint | 416/203 |
| 2,920,864 | 1/1960 | Lee | 416/203 |
| 4,076,455 | 2/1978 | Stargardter | 416/191 |
| 4,878,810 | 11/1989 | Evans | 416/203 |
| 5,156,529 | 10/1992 | Ferleger et al. | 416/203 |
| 5,286,168 | 2/1994 | Smith | 416/203 |
| 5,299,914 | 4/1994 | Schilling | 416/203 |

FOREIGN PATENT DOCUMENTS

| | | | |
|---|---|---|---|
| 150903 | 8/1984 | Japan | 416/203 |
| 324889 | 5/1984 | U.S.S.R. | 416/203 |

Primary Examiner—Edward K. Look
Assistant Examiner—James A. Larson
Attorney, Agent, or Firm—W. G. Fasse; W. F. Fasse

[57] ABSTRACT

In the rotor of a turbomachine, especially the turbine of a gas turbine engine, each rotor blade is mounted in the rotor disk rim by a blade root having a serrated profile that engages a correspondingly formed axial groove in the rotor disk rim. A shroud band is constructed so that at a predetermined operating point of the turbine, adjacent blades are supported against one another so as to damp vibrations. Light weight and heavy weight rotor blades are mounted alternatingly around the circumference of the rotor disk. The blade root and corresponding axial groove associated with each light weight or heavy weight blade are differently dimensioned or shaped to correspond to the differing loads associated with the heavy weight blades and the light weight blades respectively. Different materials, having different densities, are used for the heavy weight blades and the light weight blades.

23 Claims, 2 Drawing Sheets $\alpha_2 < \alpha_3$
$U = U'$

TURBOMACHINE ROTOR

FIELD OF THE INVENTION

The invention relates to a rotor for a turbomachine, especially for the turbine of a gas turbine engine, wherein serrated roots of the turbine blades are anchored in the rotor disk rim and adjacent blades are circumferentially braced against one another to damp vibrations.

BACKGROUND INFORMATION

The use of heat-resistant, light-weight and brittle alloys (e.g. intermetallic phases), and also ceramic materials for rotor blades has generally failed due to the low impact strength of these materials and the attending high risk of catastrophic blade damage or failure as a result of foreign body ingestion into the turbine or of a blade fracture. The heat-resistant and high-alloy materials currently in use for rotor blades, such as nickel (Ni) or cobalt (Co) based alloys, do have an adequate impact strength, but unfortunately also have a relatively high specific weight. The resulting high total rotor weight causes great stresses in the disks of high speed turbines, such as low-pressure turbines. The high rim loads arising on the outer circumference of the disk rims result in a comparatively short useful life of the disks.

An additional problem is posed by the need to cope with the relatively high blade vibration excitation energies that arise, especially in view of the rotor blade strength needed for withstanding the centrifugal loads. Thus, vibration induced fatigue results in an increased risk of blade failure.

U.S. Pat. No. 2,772,854 (Anxionnaz) (issued Dec. 4, 1956) discloses a rotor of the above described general type, wherein the rotor blade airfoils are to be braced against one another to damp vibrations, when under sufficiently high centrifugal loads. For this purpose, the prior art rotor of the above cited patent includes tongue-shaped members projecting circumferentially from the two rotor blades of each pair. The two adjacent tongue-shaped members of each pair have different circumferential lengths and overlap one another axially and circumferentially at overlapping end portions, with a spacing gap or clearance formed between the overlapping ends. When the turbine operates at a prescribed speed, this clearance or spacing gap becomes zero due to the differing radial deflection of the different length tongue-shaped members. Thus, adjacent blades are braced or supported radially against one another, so that the respective blade vibration energy of each blade is dissipated through component friction of the overlapping end portions of the tongue-shaped members rubbing against one another.

OBJECTS OF THE INVENTION

In view of the above discussion, it is the aim of the invention to achieve the following objects singly or in combination:

to provide a rotor or turbine disk construction of the above described type that effectively handles or controls the loads arising in the blades and around the outer rim of the turbine disk due to the relatively high rotational speeds and centrifugal forces, while having a relatively light weight construction as compared to prior art turbine rotors;

to provide such a turbine rotor construction in which a wider variety of materials can be used for the turbine blades, while still achieving a sufficient safety against catastrophic failure and achieving a relatively long operating life of the turbine;

to effectively damp or dissipate vibrational energy in such a rotor so as to avoid or reduce the risk of blade failure due to vibration induced material fatigue;

to provide such a turbine rotor having heavier and lighter blades alternatingly arranged around the circumference of a turbine rotor disk;

to provide such a turbine rotor having alternating blades made of differing materials, so as to achieve in the turbine rotor the advantages provided by both materials; and to support the blades of such a rotor against one another, especially in axial and circumferential directions to help damp vibrations and also to help support individual blades should a blade failure occur, so as to help avoid catastrophic failure of the rotor and allow the rotor to keep running even with a damaged blade.

SUMMARY OF THE INVENTION

The above objects have been achieved in a turbomachine rotor according to the invention, wherein the rotor disk carries alternating higher mass and lower mass blades. The higher and lower mass, or higher and lower weight, of the two types of blades is preferably achieved by making the different blades of materials having respective different densities whereby further all the blades may have airfoil portions having substantially the same size and the same shape. Each blade is secured to a rotor disk by a blade root inserted in an axial groove in the rotor disk. Thereby the blade root and the corresponding axial groove for the low mass blades has a different form than those for the high mass blades, in view of the lower centrifugal force loads acting on the lower mass blades.

Namely in this arrangement, the shapes or geometries of the blade root and the corresponding socket, e.g. axial groove or slot, in the rim of the rotor disk are designed and constructed to accommodate the respective forces and area loads that prevail locally at each blade root, for each light weight and each heavy weight rotor blade. Thereby, the moments arising on opposed or mutual contact surfaces, e.g. the contact surfaces between the blade root and the groove or slot, individually for each light weight and each heavy weight rotor blade, at a given rotational speed and centrifugal force, are to be compensated or balanced by the bearing surface contact forces of the blade root, e.g. having a fir tree or Christmas tree form, being multiplied by the local perpendicular distance or lever arm from the inertial axis of the blade.

The invention makes it possible to achieve a relatively light weight bladed rotor disk, especially in comparison to, for example, turbine rotor disks manufactured complete with rotor blades from a temperature resistant high alloy metallic material, such as a Ni or Co based alloy for example. Because, for example, every second circumferentially spaced rotor blade has a substantially lower specific weight, the outer rim loads can be appreciably reduced, which leads to a proportional or even greater than proportional increase in the operating life of the turbine rotor or the bladed disk.

The use of light weight and heavy weight rotor blades in turn preferably depends on the use of different blade materials having very different characteristics or properties, such as a different weight and stiffness and therewith different resonances. As a result of the different vibrational characteristics or behavior that are to be expected from using different materials, the invention can be carried out in combination with a corresponding suitable vibration damping, for example, between opposed or mutual abutment edges of outer shroud band segments. The vibration damping means may optionally be combined with means for providing relative torsional freedom and restraint between the rotor blades.

It is a further advantage of the invention, that light weight rotor blades can be used despite the inherently insufficient impact toughness or tendency toward brittle fracture of their materials, especially ceramic materials for example. This is achieved because even when subjected to comparatively high bending stresses, the light weight rotor blades can be respectively braced against the immediately adjacent heavy weight rotor blades, which are made of a metallic super alloy for example, within the single blade assembly. The high bending stresses may, for example, be caused by the effected blade tips grazing too hard or too deeply against the casing, or by an ingested foreign body becoming jammed between the blade tips and the casing, or by the impact of an ingested foreign body against the blades. In such a case, if a rotor blade ruptures even though it is supported in the above described manner, it is possible to allow the effected engine to coast down without any further damage, or the damaged rotor blade can be allowed to remain in place until a subsequent ground inspection and replacement of the damaged blade can be carried out.

The particular rotor construction according to the invention can be used in a variety of turbomachines, but is especially applicable for use in the turbine of a gas turbine engine. It is especially advantageous and preferred to apply the invention to the last stages of comparatively high speed, low pressure turbines of gas turbine jet engines. Further advantageous embodiments and particular details of the invention are described in detail below. For example, the specific embodiments relate to particular geometries of the blade roots and corresponding turbine disk rim grooves, particular materials that are preferably used for the light weight blades and the heavy weight blades, and particular arrangements of the mutual support or bracing provided between respective adjacent rotor blades.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
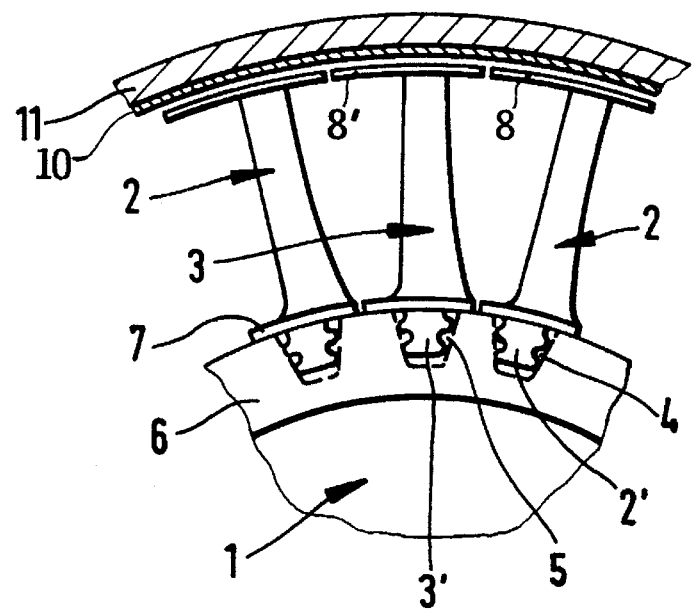
FIG. 1 is a partial axial end view, in partial section, of a rear portion of a turbine rotor disk carrying three rotor blades within a turbine housing or casing.

As is shown schematically in FIG. 1, a turbine rotor 1 is circumferentially alternatingly fitted with light weight rotor blades 2 and heavy weight rotor blades 3. The rotor blades 2 and 3 are distributed uniformly, i.e. with uniform spacings between them around the circumference of a rotor disk rim 6. The blades 2 and 3 each have a blade root 2' and 3' respectively, by which the blades are mounted in correspondingly shaped axial grooves 4 and 5 respectively, provided in the disk rim 6. In this manner, the blades 2 and 3 are held by their blade roots 2' and 3' in circumferential and radial directions. The blades 2 and 3 can be additionally supported against one another in a circumferential direction at the disk rim 6 or slightly above the rim surface by root plates or pedestals 7 provided at the radial inner end of each blade, between the blade proper or airfoil end the blade root.

As shown in FIG. 1, the blade roots 2' and 3' have a fir tree shape or fir cone shape for example, whereby for the sake of simplicity in FIG. 1, all of the blade roots are shown having the same shape or form. However, as described below with reference to FIGS. 2 and 3, the blade roots 2' of the light weight blades 2 and the corresponding grooves or slots 4 have a different shape and geometry than the blade roots 3' of the heavy weight blades 3 and the corresponding grooves 5.

Figure 2:
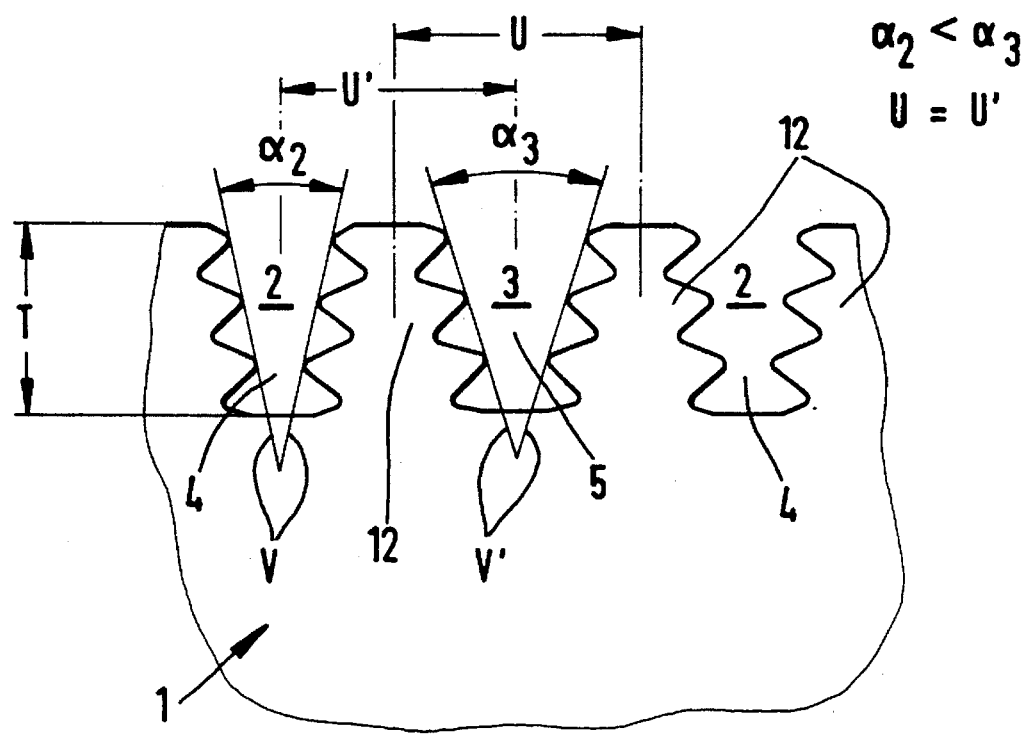
FIG. 2 is a linear projection in the plane of the drawing of a rim portion of a turbine rotor disk in a first embodiment for attaching blade roots of light weight and heavy weight rotor blades.
Figure 3:
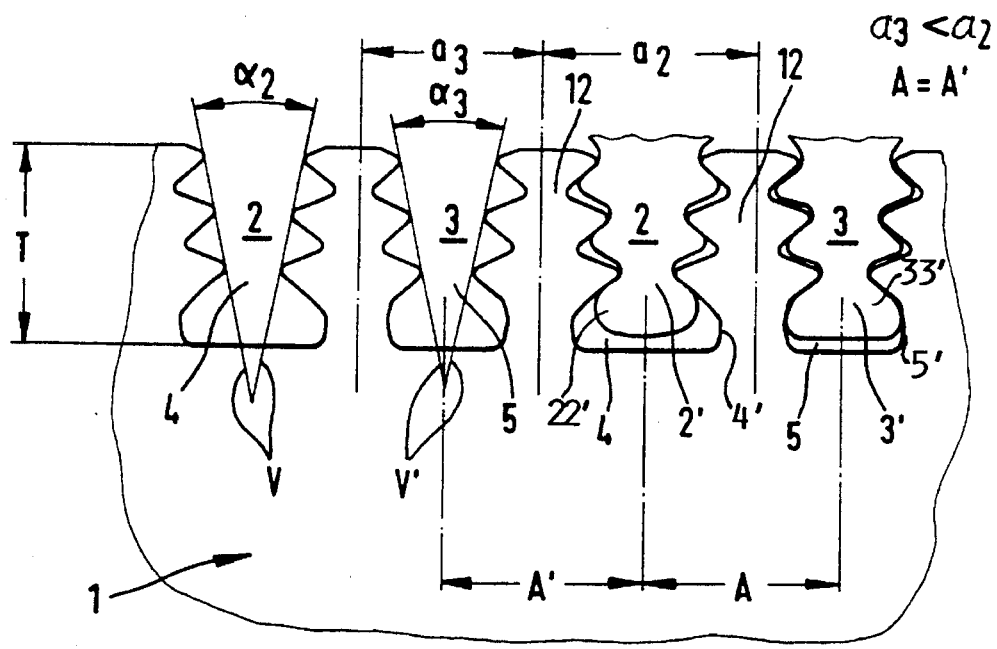
FIG. 3 is a linear projection similar to that of FIG. 2, but showing a second embodiment for attaching blade roots of light weight and heavy weight rotor blades to the rotor disk.

FIGS. 2 and 3 show two embodiments for attaching the blades 2 and 3 on the rotor disk rim 6, using different groove configurations and correspondingly different blade root profiles for the light weight blade roots 2' than for the heavy weight blade roots 3'. The axial grooves 4 and 5 and the corresponding blade roots 2' and 3' taper in a radially inward direction toward the floor or bottom of the axial grooves. More specifically, the taper V of the groove 4 and the blade root 2' of the light weight rotor blade 2 and the taper V' of the blade root 3' and the groove 5 of the heavy weight blade 3 have different forms, that is to say, different taper configurations, e.g. taper angles or dimensions, corresponding to the different force flux associated with the light weight blade 2 as compared to the heavy weight blade 3.

In FIG. 2, the grooves 4 for the light weight rotor blades 2 all have the same taper angle $\alpha_2$ of the wedge or V-shaped pointed taper V. On the other hand, the grooves 5 for the heavy weight blades 3 all have a taper angle $\alpha_3$ of the taper V' that is larger than the taper angle $\alpha_2$. Furthermore, in the embodiment of FIG. 2, serrated disk stubs or lobes 12 are formed or arranged between each pair of differently profiled axial slots or grooves 4 and 5. Each lobe or stub 12 has sawtooth-shaped serrations on its two sides, which are non-symmetrical about a centerline of the lobe 12. However, the form of the serrations on the two sides of each stub 12 is substantially similar, but the angle of inclination of each side differs. Furthermore, the radial groove depth T of the different grooves 4 and 5 is the same, as are the respective circumferential center line spacings U and U' of all the axial grooves 4 and 5 and of the disk stubs or lobes 12.

In the embodiment shown in FIG. 3, the taper angles $\alpha_2$ and $\alpha_3$ of the profiled tapers V and V' for the light weight and heavy weight blades 2 and 3 respectively are approximately equal. Alternatively, the angle $\alpha_2$ may be slightly smaller than the angle $\alpha_3$. Because the profile tapers V and V' are practically identical, it follows that each disk stub or lobe 12 can be formed or shaped symmetrically on both sides relative to its center line. In this context, it should be understood that the symmetry relates especially to the overall slope angle or angle of inclination of the fir tree serrations, while the form of the serrations themselves on both sides of each disk lobe 12 can be symmetrical or non-symmetrical in different embodiments.

Even if the outer portion of each of the grooves 4 for the light weight blades 2 formed by the fir tree serrations is substantially symmetrical to that of the grooves 5 for the heavy weight blades 3, the radially inner ends or bottoms of the grooves 4 and 5 differ from one another. As shown in FIG. 3, the bottom portion of each groove 4 and 5 has a dovetail configuration 4' and 5' respectively, which is comparatively wider than the fir tree taper. The dovetail portions 4' of the grooves 4 are shaped and dimensioned differently than the dovetail portions 5' of the grooves 5, namely the dovetail portions 4' for the light weight blades 2 are wider than the dovetail portions 5' for the heavy weight blades 3, as shown in FIG. 3. The total depth T of each of the grooves 4 and 5 is the same.

Due to the differing width of the dovetail portions 4' and 5', the center line of each disk lobe 12 at the base between adjacent dovetail portions 4' and 5' does not coincide with the apparent center line of the body of the disk lobe 12. Therefore, when the grooves 4 and 5 have a uniform circumferential spacing A, A' from one another, the base center line spacing between adjacent disk lobes 12 is not the same, namely $a_3 < a_2$.

An expanded dovetail 22' and 33' is formed on the bottom of the root 2' and 3', respectively, of each blade 2 and 3, respectively. The expanded dovetails 22' and 33' are configured differently from one another, as shown in FIG. 3. As a result, the dovetail 22' of the light weight blade 22 has a smaller contact surface contacting the adjacent disk lobes 12 as compared to the larger contact surface of the expanded dovetail 33' of the heavy weight blades 3 contacting the adjacent disk lobes 12.

In view of the operational vibrational excitation of the blades 2 and 3, which particularly are expected to cause blade vibrations of varying intensities due to the lighter weight and heavier weight and different material characteristics of the alternating light weight and heavy weight blades 2 and 3, it is necessary to provide means for damping vibrations of the blade airfoils. Accordingly, the invention provides a specially designed shroud band at the blade tips, as shown particularly in FIGS. 1 and 4.

Figure 4:
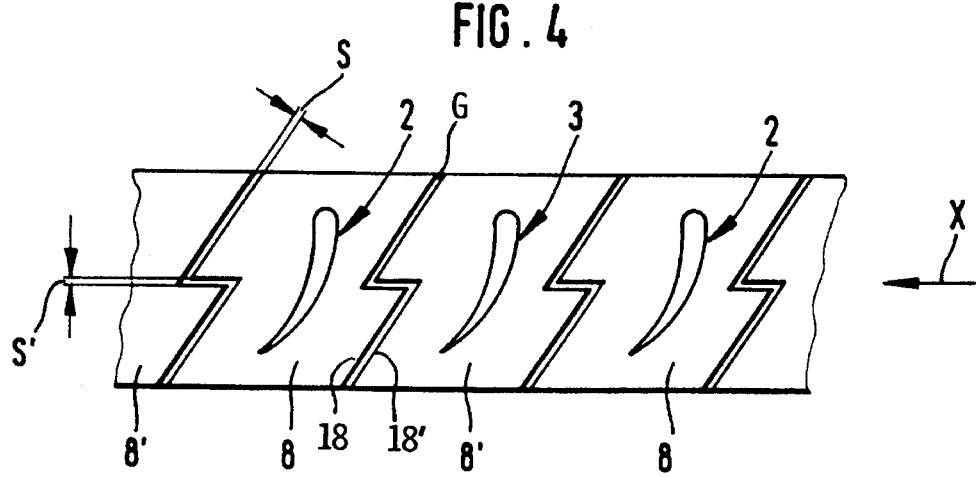
FIG. 4 is a linear projection in the plane of the drawing of a radial view of an embodiment of a shroud band for three representative rotor blades, for example as shown in FIG. 1.

As shown especially in FIG. 4, the shroud band comprises approximately equal sized shroud band segments 8 and 8' provided for the blades 2 and 3 respectively. A substantially zig-zag shaped gap G is formed between circumferentially adjacent shroud band segments 8 and 8'. Thus, each shroud band segment 8 has a substantially saw-tooth shaped abutment edge 18 facing a corresponding abutment edge 18' of each circumferential adjacent shroud band segment 8'. On a substantially axially directed or angled portion of the gap G, the abutment edges 18 and 18' are spaced from one another by a spacing S. Along a substantially circumferentially directed portion of the gap G, the abutment edges 18 and 18' are spaced from one another by a spacing S'. As also seen in FIG. 4, both types of blades 2 and 3 are preferably arranged with their respective leading edges on a common leading edge plane.

When the turbine rotor 1 is driven at a predetermined operating point that is characteristic for particularly pronounced blade vibrations, the mutual gap spacing S, S' is substantially minimized, with mutual component friction occurring between the opposing or adjacent abutment edges 18 and 18'. In this manner, the blade vibrations can be drastically damped. Individual blade torsions can be absorbed and locally limited by means of the local crosswise gap portions having a spacing S', which are arranged between the portions of the gaps G having the spacing S and extending substantially axially or at an angle to the rotor axis. Alternatively, the respective local ends of the shroud band segments along the abutment edges 18 and 18' can be embodied or constructed to overlap one another in a sealing and vibration damping manner.

Figure 5:
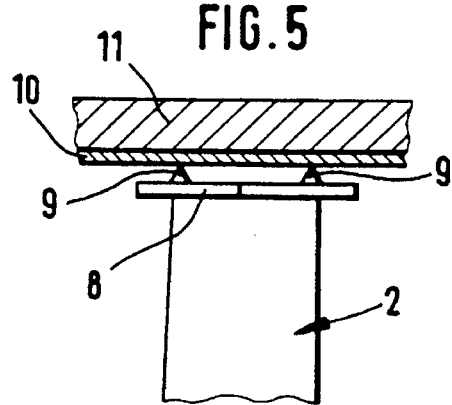
FIG. 5 is an axial section of a turbine housing and a rotor shroud band having one embodiment of a labyrinth seal, as seen in a circumferential direction indicated by the arrow X of FIG. 4.

As shown in FIG. 5, the shroud band segments, for example the shroud band segment 8 of blade 2, can be provided with circumferentially extending labyrinth seal fins. The seal fins 9 cooperate with a groovable or abradable liner 10 provided on the turbine casing or housing 11 to form a labyrinth type clearance seal at the blade tips, for preventing blow-by of the hot gas stream past the turbine rotor. Alternatively to the embodiment shown in FIGS. 4 and 5, the labyrinth seal fins 9 can be connected to a circumferentially enclosed housing structure within which the rotor blades would be arranged in a vibration damping and torsion restricting manner, approximately as shown in FIG. 4.

Further detailed aspects of the present invention will now be described without reference to any particular figure. The heavy weight rotor blades 3 can be made of a highly alloyed, heat resistant metallic alloy, while the light weight rotor blades 2 can be made of an intermetallic compound, i.e. of intermetallic phases, especially of a nickel aluminide or titanium aluminide and alloys thereof.

Alternatively, the heavy weight rotor blades 3 may be made of a heat resistant, high alloy metallic material, while the light weight rotor blades 2 can be made of a highly heat resistant, light weight material having a globular or spherical cell structure, for example, comprising hollow spherical particles. It is also possible to use the above named or other intermetallic compounds, for example, by means of sintering techniques.

As a further alternative, the heavy weight rotor blades 3 can be made of a high alloy, highly heat resistant metallic material, while the light weight blades 2 are made of a highly heat resistant ceramic material. As alternatives, the light weight blades 2 can be made of an engineering ceramic material reinforced with ceramic fibers. For example, the light weight blades 2 can be made of silicon carbide reinforced with silicon carbide fibers. Alternatively, the blades 2 may be made of silicon carbide or self-sintered silicon carbide or hot-pressed silicon carbide. Further according to the invention, the light weight blades 2 can be made of silicon nitride, which may be reaction-sintered or self-sintered or hot-pressed silicon nitride.

The light weight blades made of any of the herein described alternative materials can be used in combination with, i.e. together with, heavy weight blades 3 made of a high alloy, heat resistant metallic material, for example, an Ni and/or Co based alloy. Such a combination is especially advantageously applicable to a turbine driven by a hot gas stream.

While FIGS. 4 and 5 show the blades 2 and 3 being supported or braced against one another near their tip ends, it is also possible to brace or support all of the blades 2 and 3 against one another at a midpoint, i.e. around a middle circumferential region, in a manner similar to the shroud band construction shown in FIG. 4. Such a midpoint bracing of the blades against one another would be carried out in a torsion restricting and individually vibration compensating manner, as described above.

The above described shroud band construction can comprise elements protruding circumferentially from both sides of each blade, whereby the protruding elements may be formed integrally with each rotor blade. The projecting elements are designed and constructed so that neighboring adjacent abutment edges distributed around the circumference of the rotor abut and support against one another in axial and circumferential directions when the turbine operates at a predetermined operating point.

Although the invention has been described with reference to specific example embodiments, it will be appreciated that it is intended to cover all modifications and equivalents within the scope of the appended claims.

What is claimed is:

1. A turbomachine rotor comprising a rotor disk having a plurality of sockets in the form of axial grooves arranged around the circumference thereof, a plurality of heavier blades each having a blade root, and a plurality of lighter blades each having a blade root and being lighter in weight than each of said heavier blades, wherein said heavier blades and said lighter blades are arranged in a regular alternating sequence of one of said heavier blades followed by one of said lighter blades around said circumference of said rotor disk with respective ones of said blade roots in form-locking engagement with respective corresponding ones of said sockets, and wherein said blade roots of said heavier blades and corresponding ones of said sockets have a different form than said blade roots of said lighter blades and corresponding ones of said sockets, wherein said different form is matched to different centrifugal force loads effective on said heavier blades as compared to said lighter blades, and wherein said heavier blades and said lighter blades are arranged with respective leading edges on a common leading edge plane.

2. The turbomachine rotor of claim 1, wherein said form of each of said blade roots comprises a plurality of serrations and said form of each of said corresponding sockets comprises mating serrations corresponding to said blade root serrations.

3. The turbomachine rotor of claim 2, wherein said sockets have a radial depth that is the same for all of said sockets and said blade roots have a radial length that is the same for all of said blade roots.

4. The turbomachine rotor of claim 2, wherein said blade roots each comprise a fir-tree serrated shape tapering overall toward a radially inner root end, wherein a serration profile is substantially the same on a left side and a right side of said blade roots and a taper angle of said blade roots of said heavier blades differs from a taper angle of said blade roots of said lighter blades correspondingly to said different centrifugal force loads effective on said heavier blades as compared to said lighter blades.

5. The turbomachine rotor of claim 2, wherein each of said blade roots comprises an expanded dovetail at a radially inner end thereof, and wherein said dovetails of said heavier blades have larger contact surfaces contacting walls of said sockets as compared to smaller contact surfaces of said dovetails of said lighter blades.

6. The turbomachine rotor of claim 2, wherein said rotor disk comprises disk lobes extending radially outwardly around said circumference of said disk, said sockets are formed between adjacent ones of said disk lobes, and each of said disk lobes comprises a fir-tree serrated shape having a different serration profile on a left side than on a right side of said disk lobe.

7. The turbomachine rotor of claim 1, wherein said heavier blades consist of a first material and said lighter blades consist of a second material, and said first material has a higher density than said second material.

8. The turbomachine rotor of claim 7, wherein said first material of said heavier blades comprises a heat resistant, high alloy, metallic material.

9. The turbomachine rotor of claim 8, wherein said heat resistant, high alloy, metallic material comprises a material selected from the group consisting of cobalt based alloys, nickel based alloys and combinations thereof.

10. The turbomachine rotor of claim 8, wherein said second material of said lighter blades comprises a temperature resistant intermetallic compound.

11. The turbomachine rotor of claim 10, wherein said intermetallic compound comprises a material selected from the group consisting of nickel aluminides, titanium aluminides and alloys thereof.

12. The turbomachine rotor of claim 7, wherein said second material of said lighter blades comprises a heat resistant, lightweight material having a spherical cellular structure.

13. The turbomachine rotor of claim 8 wherein said second material of said lighter blades comprises a temperature resistant lightweight material having a spherical cellular structure.

14. The turbomachine rotor of claim 8, wherein said second material of said lighter blades comprises a ceramic material.

15. The turbomachine rotor of claim 14, wherein said ceramic material comprises a ceramic composite material comprising a ceramic matrix material reinforced with ceramic fibers.

16. The turbomachine rotor of claim 15, wherein said ceramic matrix material comprises silicon carbide and said ceramic fibers comprise silicon carbide fibers.

17. The turbomachine rotor of claim 14, wherein said ceramic material comprises a material selected from the group consisting of self-sintered silicon carbide and hot-pressed silicon carbide.

18. The turbomachine rotor of claim 14, wherein said ceramic material comprises a material selected from the group consisting of reaction-sintered silicon nitride, self-sintered silicon nitride and hot-pressed silicon nitride.

19. The turbomachine rotor of claim 1, further comprising vibration damping members supporting each of said blades against adjacent ones of said blades circumferentially around said rotor.

20. The turbomachine rotor of claim 19, wherein said vibration damping members comprise circumferentially projecting members extending from opposite sides of each of said blades at a location selected from the group consisting of locations along the length of said blades not immediately adjacent said blade roots and locations at the radially outer tip of said blades, wherein each of said projecting members comprises an abutment edge at a free end thereof, wherein each said abutment edge faces said abutment edge of an adjacent opposing projecting member with a clearance gap therebetween, wherein said gap is adapted to diminish and said adjacent abutment edges are adapted to contact each other to provide circumferentially and axially directed support between adjacent ones of said blades and to damp vibrations and restrict torsions of said blades at a particular operating condition of said turbomachine rotor.

21. The turbomachine rotor of claim 19, wherein said vibration damping members are respectively arranged at radially outer ends of said blades, and are configured and adapted to brace against one another to damp vibrations and restrict torsions of said blades.

22. The turbomachine rotor of claim 1, wherein each of said blades further comprises an airfoil portion, and wherein said airfoil portions of said heavier blades and of said lighter blades each have the same size and the same shape.

23. A turbomachine rotor comprising a rotor disk having a plurality of sockets in the form of axial grooves arranged around the circumference thereof, a plurality of heavier blades each having a blade root, and a plurality of lighter blades each having a blade root and being lighter in weight than each of said heavier blades, wherein said heavier blades and said lighter blades are arranged in a regular alternating sequence of one of said heavier blades followed by one of said lighter blades around said circumference of said rotor disk with respective ones of said blade roots in form-locking engagement with respective corresponding ones of said sockets, and wherein said blade roots of said heavier blades and corresponding ones of said sockets have a different form than said blade roots of said lighter blades and corresponding ones of said sockets, wherein said different form is matched to different centrifugal force loads effective on said heavier blades as compared to said lighter blades, wherein said form of each of said blade roots comprises a plurality of serrations and said form of each of said corresponding sockets comprises mating serrations corresponding to said blade root serrations, and wherein said sockets have a radial depth that is the same for all of said sockets and said blade roots have a radial length that is the same for all of said blade roots.

* * * * *